United States Patent
Chen et al.

(10) Patent No.: US 10,363,884 B2
(45) Date of Patent: Jul. 30, 2019

(54) MULTIFUNCTIONAL VEHICLE-MOUNTED MOBILE PHONE HOLDER

(71) Applicants: Wen Chen, Guangzhou (CN); Feng Yu, Guangzhou (CN)

(72) Inventors: Wen Chen, Guangzhou (CN); Feng Yu, Guangzhou (CN)

( * ) Notice: Subject to any disclaimer, the term of this patent is extended or adjusted under 35 U.S.C. 154(b) by 0 days.

(21) Appl. No.: 15/835,476

(22) Filed: Dec. 8, 2017

(65) Prior Publication Data

US 2018/0281694 A1 Oct. 4, 2018

(30) Foreign Application Priority Data

Mar. 29, 2017 (CN) .......................... 2017 1 0196309

(51) Int. Cl.
| | |
|---|---|
| B60R 11/02 | (2006.01) |
| B60R 21/00 | (2006.01) |
| A62B 3/00 | (2006.01) |
| H04B 1/3888 | (2015.01) |
| H04B 1/3877 | (2015.01) |
| B60R 22/32 | (2006.01) |

(52) U.S. Cl.
CPC ............ B60R 11/0241 (2013.01); A62B 3/00 (2013.01); A62B 3/005 (2013.01); B60R 21/00 (2013.01); H04B 1/3877 (2013.01); H04B 1/3888 (2013.01); B60R 2011/0294 (2013.01); B60R 2022/328 (2013.01)

(58) Field of Classification Search
None
See application file for complete search history.

(56) References Cited

U.S. PATENT DOCUMENTS

| | | | | |
|---|---|---|---|---|
| 9,375,589 | B1 * | 6/2016 | Goodman | A62B 3/005 |
| 2003/0061665 | A1 * | 4/2003 | Chen | B25G 1/085 |
| | | | | 7/100 |
| 2004/0184260 | A1 * | 9/2004 | Kukuk | F21V 33/0064 |
| | | | | 362/96 |
| 2011/0136555 | A1 * | 6/2011 | Ramies | B67B 7/16 |
| | | | | 455/575.8 |
| 2012/0267406 | A1 * | 10/2012 | Fan | B60R 11/02 |
| | | | | 224/482 |
| 2014/0216976 | A1 * | 8/2014 | Conarro | A45C 11/00 |
| | | | | 206/525 |
| 2015/0033477 | A1 * | 2/2015 | Rubin | B25D 5/02 |
| | | | | 7/158 |
| 2015/0059529 | A1 * | 3/2015 | Franken | B25D 1/02 |
| | | | | 81/25 |

FOREIGN PATENT DOCUMENTS

CN 204701560 U * 10/2015

\* cited by examiner

*Primary Examiner* — David Bilodeau
(74) *Attorney, Agent, or Firm* — Leong C. Lei

(57) ABSTRACT

A multifunctional vehicle-mounted mobile phone holder is provided with a window glass breaker on a mounting seat. Under the premise of the mobile phone holder able to retain a mobile phone in a car, the mobile phone holder can be used to break the window glass of the car when there is an emergency for the driver or passenger to escape from the car. The mobile phone holder is convenient and practical. The mobile phone holder can reduce the number of car accessories and the space occupied by the car accessories due to the combination of multiple functions.

5 Claims, 7 Drawing Sheets

MULTIFUNCTIONAL VEHICLE-MOUNTED MOBILE PHONE HOLDER

BACKGROUND OF THE INVENTION

1. Field of the Invention

The present invention relates to car accessories, and more particularly, to a multifunctional vehicle-mounted mobile phone holder.

2. Description of the Prior Art

In order to facilitate people to use mobile phones while taking a car for talking, navigation or other purposes, mobile phone holders have been widely used. With an increase in the safety awareness, a safety hammer is an essential tool provided in the car for use in an emergency to ensure the safety of the driver and passengers. A conventional mobile phone holder can only be used for placement of a mobile phone. A safety hammer can only realize an emergency survival function. Both of them have a single function. It is required to provide both the mobile phone holder and the safety hammer in the car, which takes up too much space. In general, when not in use, the safety hammer is stored in a toolbox. This is inconvenient for use. In the event of an emergency, it is difficult for the driver or the passenger to find out the safety hammer to crush the window, so the driver or the passenger cannot escape from the car immediately.

SUMMARY OF THE INVENTION

In view of the problems of the prior art, the primary object of the present invention is to provide a multifunctional vehicle-mounted mobile phone holder which can reduce the number of car accessories and the space occupied by the car accessories and is able to break a window glass. It is convenient and practical for use.

According to one aspect of the present invention, a multifunctional vehicle-mounted mobile phone holder is provided. The multifunctional vehicle-mounted mobile phone holder comprises a holder body for retaining a mobile phone and a mounting seat for connecting with a component in a car. The holder body is connected to the mounting seat. The holder body is provided with a window glass breaker.

According to another aspect of the present invention, a multifunctional vehicle-mounted mobile phone holder is provided. The multifunctional vehicle-mounted mobile phone holder comprises a holder body for retaining a mobile phone and a mounting seat for connecting with a component in a car. The holder body is connected to the mounting seat. The holder body is provided with a cutter.

The multifunctional vehicle-mounted mobile phone holder of the present invention is provided with the window glass breaker on the mounting seat. Under the premise of the mobile phone holder able to retain the mobile phone in the car, the mobile phone holder can be used to break the window glass when there is an emergency for the driver or passenger to escape from the car. The mobile phone holder is convenient and practical. The mobile phone holder can reduce the number of car accessories and the space occupied by the car accessories due to the combination of multiple functions.

DETAILED DESCRIPTION OF THE PREFERRED EMBODIMENTS

Embodiments of the present invention will now be described, by way of example only, with reference to the accompanying drawings.

Figure 1:
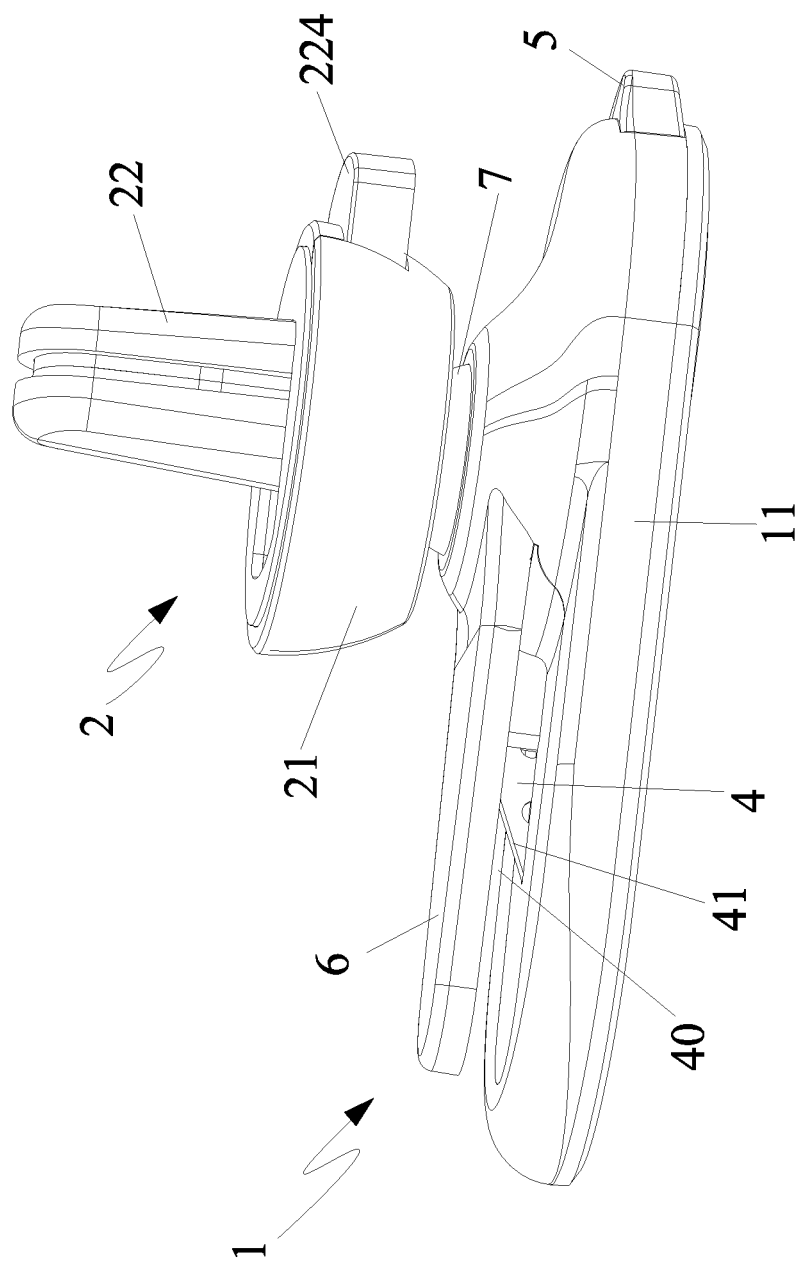
FIG. 1 is a schematic view of a multifunctional vehicle-mounted mobile phone holder according to a first embodiment of the present invention.
Figure 2:
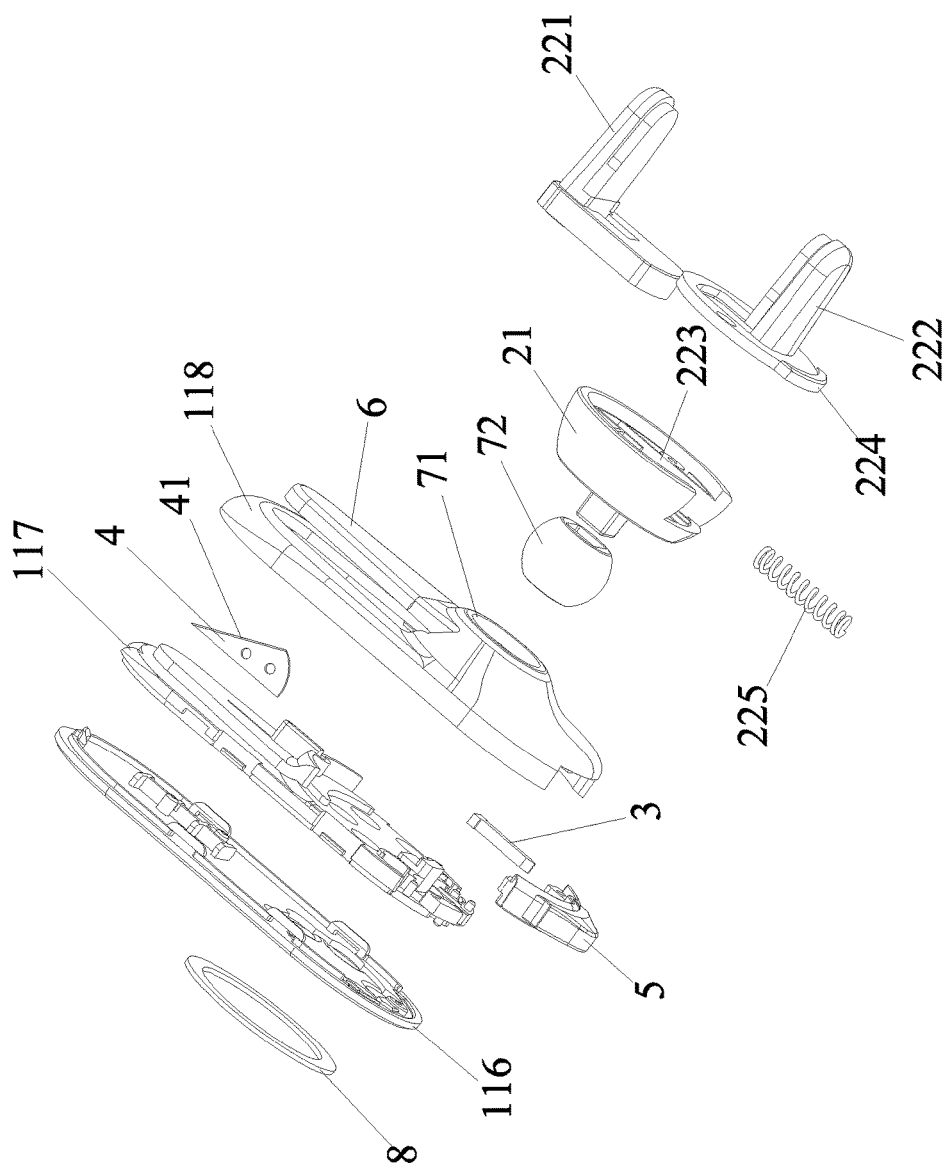
FIG. 2 is an exploded view of FIG. 1.

As shown in FIG. 1 and FIG. 2, a multifunctional vehicle-mounted mobile phone holder according to a preferred embodiment of the present invention comprises a holder body 1 for retaining a mobile phone and a mounting seat 2 for connecting with a vehicle-mounted air conditioner blade. The holder body 1 is rotatably connected to the mounting seat 2 through a spherical hinge 7 so that the holder body 1 can be rotated with the spherical hinge 7 as the center of rotation to achieve a universal rotation. The mounting seat 2 is provided with a window glass breaker 3. When there is an emergency, the window glass of the car can be broken by the window glass breaker 3 for the driver or passenger to escape from the car.

As shown in FIG. 1 and FIG. 2, the holder body 1 includes a base 11 and a mobile phone mounting member disposed on the base 11 for retaining the mobile phone. The base 11 is substantially oval, and comprises a first half casing 116 and a second half casing 118. A reinforcing plate 117 is provided between the first half casing 116 and the second half casing 118. The first half casing 116 and the second half casing 118 are configured to cover the reinforcing plate 117. The window glass breaker 3 is disposed at one end of the base 11. The root of the window glass breaker 3 is inserted into the reinforcing plate 117. The reinforcing plate 117 has a high structural strength, so it is able to resist the strong impact force of the window glass breaker 3 at the time of breaking the window. The outer surface of the window glass breaker 3 is covered with a flexible protective cover 5. Under normal circumstances, the flexible protective cover 5 can cover the sharp tip of the window glass breaker 3 to prevent a person from touching the window glass beaker 3 accidentally to cut his/her fingers. When in use for breaking a window, the flexible protective cover 5 is first in contact with the window glass surface, thereby preventing the window glass breaker 3 from slipping from the point of impact on the window glass surface. The window glass breaker 3 pierces through the flexible protective cover 5. The tip of the window glass breaker 3 extends out of the flexible protective cover 5 to get contact with the window glass surface, so that the window glass breaker 3 impacts at a single point, which is more likely to break the window glass. Preferably, the flexible protective cover 5 may be a silicone protective sleeve to achieve the desired effect.

As shown in FIG. 1 and FIG. 2, the mobile phone mounting member is disposed on the front of the base 11. The specific structure of the mobile phone mounting member is an adsorbing member disposed on the front of the base 11, for example, an annular magnet 8. The magnet 8 is able to attract an iron ring disposed on the mobile phone. Of course, the adsorbing member may be a suction cup disposed on the front of the base 11. The suction cup can suck the back of the mobile phone to retain the mobile phone.

The back of the base 11 is provided with a cutter 4 for cutting a seat belt or other ropes in the vehicle. The cutter 4 has a cutting edge 41 inclined to the outer surface of the base 11. A guard 6 is provided above the cutting edge 41. The guard 6 is substantially parallel to the back of the base 11. One end of the guard 6 is fixedly connected to the base, and the other end of the guard 6 is suspended. The guard 6 is configured to shield the cutting edge 41, preventing a person from touching the window glass beaker 3 accidentally to cut his/her fingers. The cutting edge 41 and the suspended end of the guard 6 form a triangular cutting entrance 40. When an article is cut, the guard 6 can block the article from slipping, making it easier for the inclined cutting edge 41 to cut the article.

As shown in FIG. 1 and FIG. 2, the mounting seat 2 includes an adjusting base 21 and a blade clamp 22. The adjusting base 21 is substantially cylindrical. The bottom end of the adjusting base 21 is connected to the base 11 through the spherical hinge 7. Specifically, the spherical hinge 7 includes a hinge seat 71 and a ball 72. The hinge seat 71 is disposed on the back of the base 11. The ball 72 is connected to the bottom of the adjusting base 21. The ball 72 is connected to the hinge seat 71 to achieve a universal rotation. The blade clamp 22 is disposed on the top of the adjusting base 21. The adjusting base 21 is provided with a regulator (not labeled). By pressing the regulator, the opening and closing of the blade clamp 22 can be adjusted.

As shown in FIG. 1 and FIG. 2, the blade clamp 22 includes an immovable blade 221 and a movable blade 222 opposite to each other. An upper end surface of the adjusting base 21 is formed with a mounting trough 223. A bottom end of the immovable blade 221 is fixed to the mounting trough 223. One side of a bottom end of the movable blade 222 is provided with a button 224. The button 224 is movably disposed in the mounting trough 223. The button 224 has a press end extending out of a side wall of the adjusting base 21 from the mounting trough 223. A spring 225 is provided in the mounting trough 223. The spring 225 is compressively disposed between a side wall of the mounting trough 223 and the button 224 so that the movable blade 222 always has a tendency to lean against the immovable blade 221. When the button 224 is pressed, it is necessary to overcome the restoring force of the spring 225 so that the movable blade 222 is moved away from the immovable blade 221 and the blade clamp 22 is opened. When the button 224 is released, the movable blade 222 leans against the immovable blade 221 again under the action of the restoring force of the spring 225 so that the blade clamp 22 is closed.

Of course, the window glass breaker 3 in this embodiment may be disposed on the top of the blade clamp 22, and the cutter 4 may be disposed at one side of the base 11 or one side of the adjusting base 21.

Figure 3:
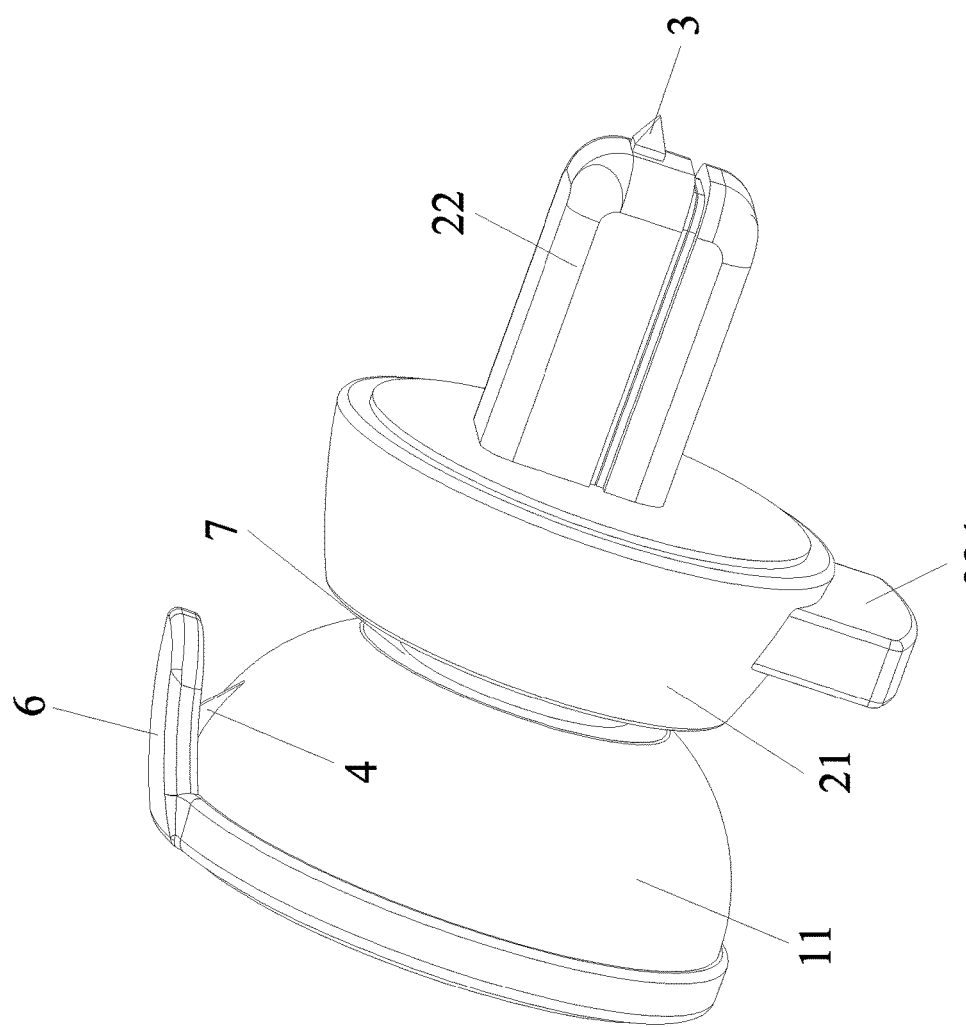
FIG. 3 is a schematic view of a multifunctional vehicle-mounted mobile phone holder according to a second embodiment of the present invention.

FIG. 3 illustrates a multifunctional vehicle-mounted mobile phone holder according to a second embodiment of the present invention, which is substantially similar to the first embodiment with the exceptions described hereinafter. In this embodiment, a base 11 has a hemispherical or disc shape. A window glass breaker 3 is disposed on the top of a blade clamp 22. A cutter 4 is disposed at a side wall of the base 11. A guard 6 is disposed directly above the cutter 4.

Figure 4:
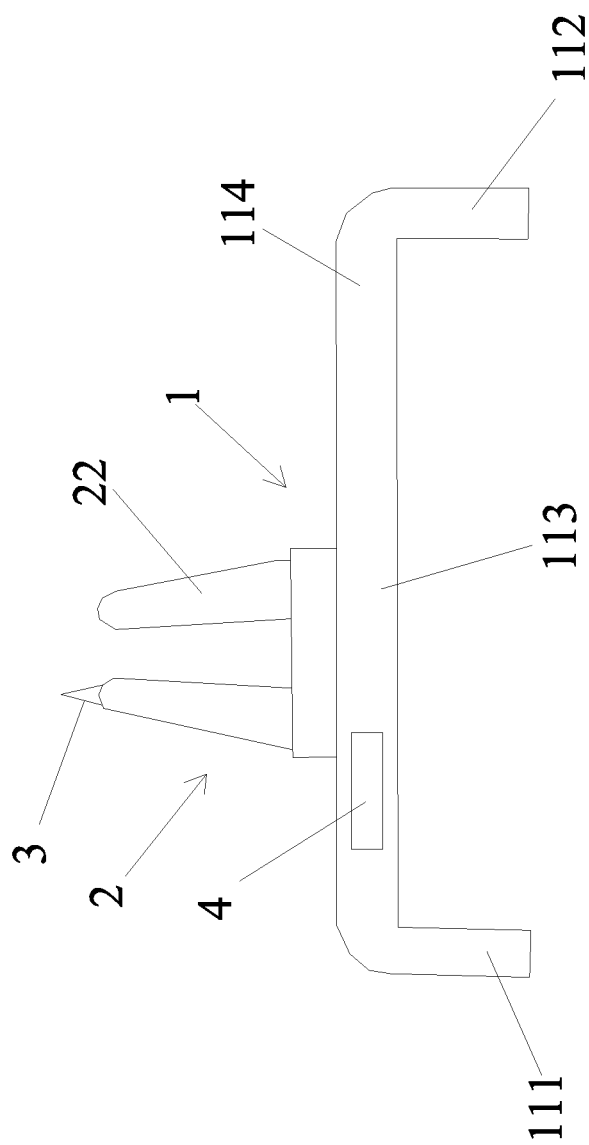
FIG. 4 is a schematic view of a multifunctional vehicle-mounted mobile phone holder according to a third embodiment of the present invention.

FIG. 4 illustrates a third embodiment of the present invention. In this embodiment, a base 11 has a rectangular shape. Two ends of the base 11 are perpendicularly provided with a first arm 111 and a second arm 112, respectively. The first arm 111, the base 11 and the second arm 112 enclose a mobile phone receiving trough so that the movable phone can be engaged in the movable phone receiving trough to be retained therein. The bottom of a mounting seat 2 is fixedly connected to the back of the base 11. Of course, the mounting seat 2 may achieve a universal connection through a spherical hinge and the base 11.

The top of the mounting seat 2 is provided with a blade clamp 22. The window glass breaker 3 is disposed on the top of the blade clamp 22. A cutter 4 is dispoded on the side wall of the base 11.

Figure 5:
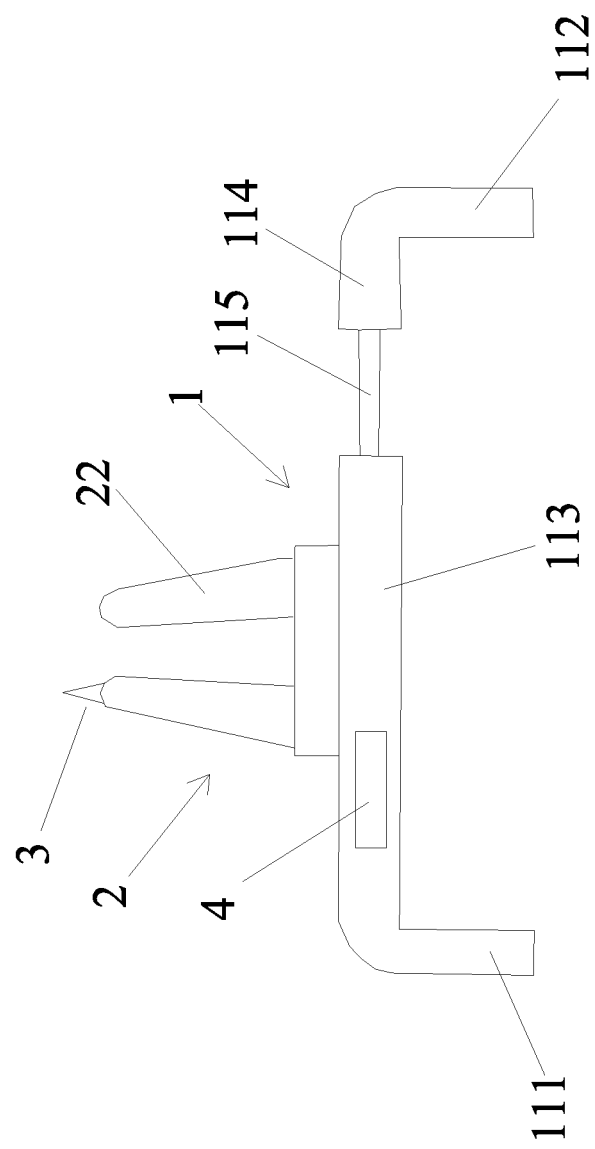
FIG. 5 is a schematic view of a multifunctional vehicle-mounted mobile phone holder according to a fourth embodiment of the present invention.

FIG. 5 illustrates a multifunctional vehicle-mounted mobile phone holder according to a fourth embodiment of the present invention, which is substantially similar to the second embodiment with the exceptions described hereinafter. A base 11 includes a first half plate 113 and a second half plate 114. The first arm 111 is disposed at one end of the first half plate 113. Another end of the first half plate 113 is provided with a guide groove (not shown in the drawings) along its lengthwise direction. The second arm 112 is disposed at one end of the second half plate 114. Another end of the second half plate 114 is provided with a guide rod 115. The guide rod 115 is movably disposed in the guide groove. Through such a structure, the distance between the first arm 111 and the second arm 112 can be adjusted to adjust the width of the mobile phone receiving trough so as to receive mobile phones with different widths.

Figure 6:
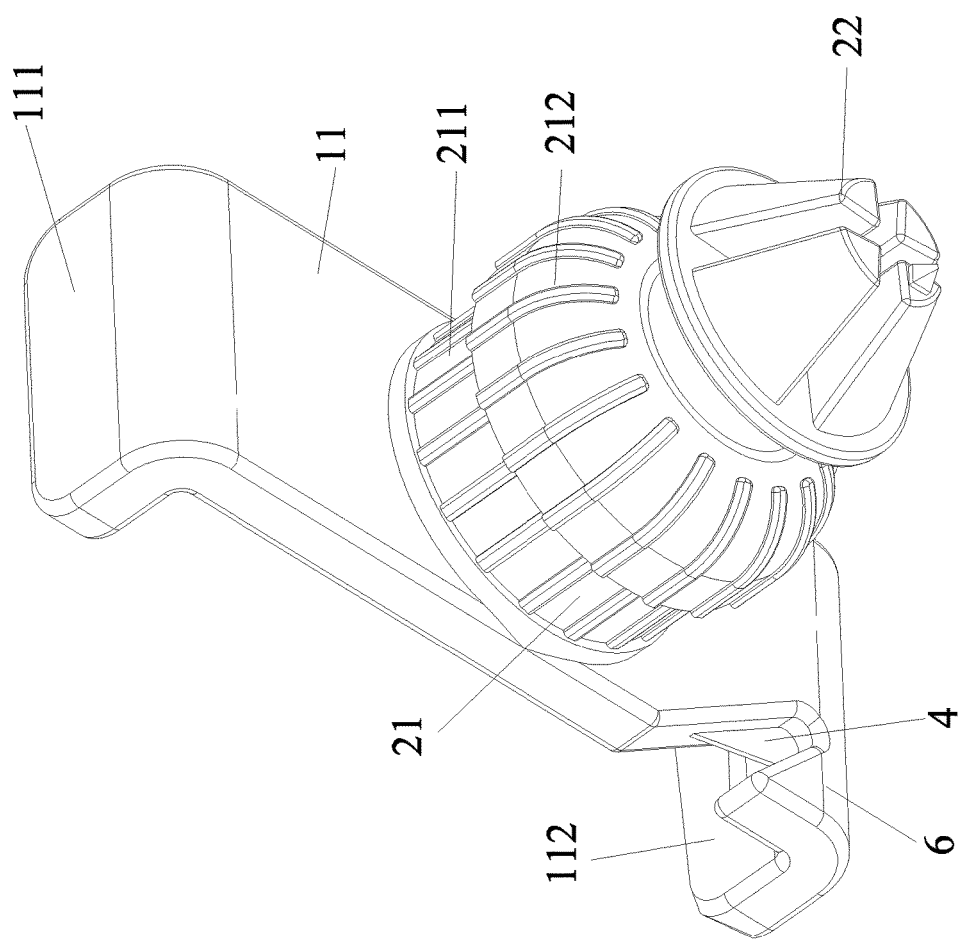
FIG. 6 is a schematic view of a multifunctional vehicle-mounted mobile phone holder according to a fifth embodiment of the present invention.

FIG. 6 illustrates a fifth embodiment of the present invention. In this embodiment, a holder body 1 is substantially similar to that the third embodiment with the exceptions described hereinafter. A side wall of a base 11 is provided with an inclined recess. A cutter 4 is disposed in the recess. A top wall of the recess constitutes a guard 6. A mounting seat 2 comprises an adjusting base 21 and a blade clamp 22. Wherein, the adjusting base 21 comprises a sleeve post 211 and a sleeve 212. A bottom end of the sleeve post 211 is fixed to the back of the base 11. The sleeve 212 is movably fitted on the top end of the sleeve post 211. The blade clamp 22 is fixed on the sleeve 212. A spring is provided in the sleeve 212. When the sleeve 212 is pressed to move in the axial direction of the sleeve post 211, the blade clamp 22 is opened or closed.

Figure 7:
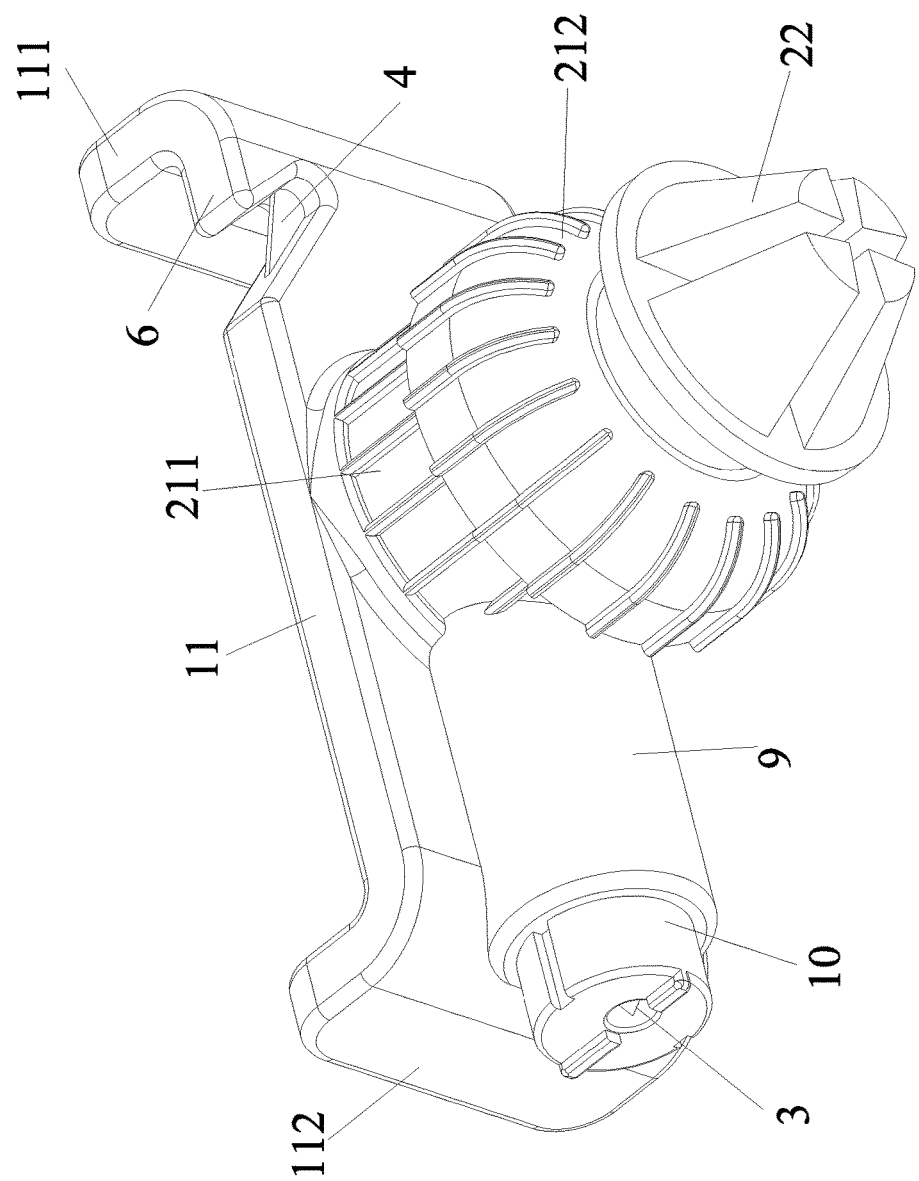
FIG. 7 is a schematic view of a multifunctional vehicle-mounted mobile phone holder according to a sixth embodiment of the present invention.

FIG. 7 illustrates a multifunctional vehicle-mounted mobile phone holder according to a sixth embodiment of the present invention, which is substantially similar to the fifth embodiment with the exceptions described hereinafter. The back of the base 11 is provided with a mounting post 9 extending along the lengthwise direction of the base 11. A connecting end of the mounting post 9 is connected with a sleeve post 211. A protruding end of the mounting post 9 extends beyond an end surface of the base 11. A window glass breaker 3 is provided on the protruding end of the mounting post 9. The protruding end of the mounting post 9 is movably connected with an elastic protective cover 10. The elastic protective cover 10 covers the window glass breaker 3. A top wall of the elastic protective cover 10 is formed with an opening corresponding in position to the window glass breaker 3. Under normal circumstances, the window glass breaker 3 is covered by the elastic protective cover 10 to prevent the user's fingers from being cut. When in use for breaking a window, the elastic protective sleeve 10 is first in contact with the window glass surface and then retracted in the mounting post 9, so that the window glass breaker 3 extends out of the opening to contact the window glass surface so as to break the window glass.

A multifunctional vehicle-mounted mobile phone holder according to a seventh embodiment is substantially similar to any one of the aforesaid embodiments with the exceptions described hereinafter. The multifunctional vehicle-mounted mobile phone holder in this embodiment is only provided with a cutter, without a window glass breaker and a protective cover for covering the window glass breaker.

A multifunctional vehicle-mounted mobile phone holder according to an eighth embodiment is substantially similar to any one of the aforesaid embodiments with the exceptions described hereinafter. The multifunctional vehicle-mounted mobile phone holder in this embodiment is only provided with a window glass breaker, without a cutter and a protective cover.

To sum up, the multifunctional vehicle-mounted mobile phone holder of the embodiments of the present invention is provided with the window glass breaker 3. When there is an emergency, the window glass of the car can be broken by the window glass breaker 3 for the driver or passenger to escape from the car. In addition, the holder body 1 is provided with the cutter 4 for cutting the seat belts or other ropes. The mobile phone holder can reduce the number of car accessories and the space occupied by the car accessories due to the combination of multiple functions.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A multifunctional vehicle-mounted mobile phone holder, comprising a holder body for retaining a mobile phone and a mounting seat for connecting with a component in a car, the holder body being connected to the mounting seat, the holder body being provided with a window glass breaker;
   wherein an outer surface of the window glass breaker is covered with a flexible protective cover so that a sharp tip of the window glass breaker is enclosed by the flexible protective cover, and the flexible protective cover is a silicone protective cover;
   wherein the mounting seat comprises an adjusting base and a blade clamp, the blade clamp is disposed on the adjusting base, the blade clamp includes an immovable blade and a movable blade opposite to each other, an end surface of the adjusting base is formed with a mounting trough, a bottom end of the immovable blade is fixed to the mounting trough, a bottom end of the movable blade is provided with a button, the button is movably disposed in the mounting trough, the button has a press end extending out of a side wall of the adjusting base from the mounting trough, a spring is provided in the mounting trough, and the spring is compressively disposed between a side wall of the mounting trough and the button so that the movable blade always has a tendency to lean against the immovable blade.

2. The multifunctional vehicle-mounted mobile phone holder as claimed in claim 1, wherein the holder body is provided with a cutter.

3. The multifunctional vehicle-mounted mobile phone holder as claimed in claim 1, wherein the holder body includes a base, two ends of the base are perpendicularly provided with a first arm and a second arm respectively, the first arm, the base and the second arm enclose a mobile phone receiving trough; the base includes a first half plate and a second half plate, the first arm is disposed at one end of the first half plate, another end of the first half plate is provided with a guide groove along its lengthwise direction, the second arm is disposed at one end of the second half plate, another end of the second half plate is provided with a guide rod, and the guide rod is movably disposed in the guide groove.

4. The multifunctional vehicle-mounted mobile phone holder as claimed in claim 3, wherein a back of the base is provided with a mounting post extending along a lengthwise direction of the base, a connecting end of the mounting post is connected to the mounting seat, a protruding end of the mounting post extends beyond an end surface of the base, the window glass breaker is disposed on the protruding end of the mounting post, the protruding end of the mounting post is movably connected with an elastic protective cover, the elastic protective cover covers the window glass breaker, and a top wall of the elastic protective cover is formed with an opening corresponding in position to the window glass breaker.

5. The multifunctional vehicle-mounted mobile phone holder as claimed in claim 1, wherein a back of a base of the holder body is connected to the mounting seat through a spherical hinge, and a front of the base is provided with a suction cup or a magnet for retaining the mobile phone.

* * * * *